United States Patent
Hartless

(10) Patent No.: US 8,219,130 B2
(45) Date of Patent: Jul. 10, 2012

(54) ESTIMATING TIME DELAYS IN A SIMULCAST COMMUNICATION SYSTEM

(75) Inventor: Mac Lamar Hartless, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 162 days.

(21) Appl. No.: 12/705,176

(22) Filed: Feb. 12, 2010

(65) Prior Publication Data

US 2010/0144382 A1    Jun. 10, 2010

Related U.S. Application Data

(62) Division of application No. 11/350,630, filed on Feb. 9, 2006, now abandoned.

(51) Int. Cl.
 *H04B 7/00*    (2006.01)
 *H04B 15/00*   (2006.01)
(52) U.S. Cl. ...................................... 455/503
(58) Field of Classification Search ............... 455/503
 See application file for complete search history.

(56) References Cited

U.S. PATENT DOCUMENTS

| | | | | |
|---|---|---|---|---|
| 5,280,629 A * | 1/1994 | Lo Galbo et al. | ............ | 455/503 |
| 6,266,536 B1 * | 7/2001 | Janky | ............ | 455/503 |
| 6,958,658 B2 * | 10/2005 | Shah et al. | ............ | 331/57 |
| 2004/0110514 A1 * | 6/2004 | Kim et al. | ............ | 455/456.1 |
| 2006/0209710 A1 * | 9/2006 | Watanabe | ............ | 370/252 |
| 2006/0209881 A1 * | 9/2006 | Howard | ............ | 370/465 |

OTHER PUBLICATIONS

Proakis, Equalization—Digital Communications, Chapter 11: Adaptive Equalization, date unknown, pp. 675-677.

* cited by examiner

*Primary Examiner* — Duc Nguyen
*Assistant Examiner* — Ankur Jain
(74) *Attorney, Agent, or Firm* — Allen, Dyer, Doppelt, Milbrath & Gilchrist, P.A.

(57) ABSTRACT

A method for facilitating an equalization of a simulcast signal comprising: (a) receiving a simulcast signal comprising known data simulcast from at least two different sites; (b) generating a number of simulated simulcast signals, each simulated simulcast signal being based on at least two sites transmitting said known data with a presumed time delay, each simulated simulcast signal having a different presumed time delay; (c) determining which of said simulated simulcast signals is an optimum simulated simulcast signal that correlates most closely to said simulcast signal; and (d) providing time delay data of said optimum simulated simulcast signal for use in equalization of said simulcast signal.

29 Claims, 4 Drawing Sheets

ESTIMATING TIME DELAYS IN A SIMULCAST COMMUNICATION SYSTEM

RELATED APPLICATION

This application is a divisional of Ser. No. 11/350,630 filed Feb. 9, 2006 now abandoned, the entire disclosure of which is hereby incorporated herein by reference.

FIELD OF INVENTION

The present invention relates generally to telecommunications systems and methods for simultaneously broadcasting a signal from multiple transmitters in a mobile radio network, and, more specifically, to compensating for overlap between simulcast signals in a simulcast radio network.

BACKGROUND AND OBJECTS OF THE PRESENT INVENTION

A simulcast, or simultaneous broadcast, network is a well known wireless communication system. Such systems are described, for example, in U.S. Pat. No. 6,266,536, herein incorporated by reference. Briefly, a simulcast system is a mobile radio system architecture in which two or more transmitters operate on a single radio frequency over a common area and transmit the same information. Simulcast provides some significant advantages, including wide-area communications with a limited number of channels without the use of a multisite switch. In addition, a simulcast system provides more efficient use of channels in situations where groups operate in multiple locations. Furthermore, simulcast systems offer seamless roaming within the total simulcast coverage area, provide efficient coverage in areas with difficult terrain, and provide improved in-building coverage in some cases due to the multiple transmitter concept.

Nevertheless, simulcast systems are faced with a number of performance issues, especially when digital voice or digital data are transmitted. These issues are addressed with reference to FIG. 5, which shows a simulcast system 510 having only two transmitters 524a and 524b. Both transmitters 524a and 524b are connected to a central control point 523, or master base station, which utilizes special circuitry to transmit a signal to each transmitter 524a and 524b for simultaneous broadcast of the signal in a cell 522a and 522b associated with each transmitter 524a and 524b, respectively, using the same radio frequency (RF). Each transmitter 524a and 524b is connected to the control point 523 via a dedicated, phasestable microwave or optic fiber backbone system.

Typically, there is a delay introduced by the control point 523 in the sending of the signal to the various transmitters 524a and 524b depending upon the distance between the control point 523 and the transmitters 524a and 524b. For example, if a first transmitter 524a is 10 kilometers away from the control point 523, while a second transmitter 524b is 520 kilometers away from the control point 523, the control point 523 will delay sending the signal to the first transmitter 524a, so that the signal will arrive at both transmitters at the exact same time. This difference in transmission times is generally referred to as the timing differential.

Between the transmitters 524a, 524b is a mobile unit 520 is the physical equipment, e.g., a car-mounted mobile radio or other portable radio, used by mobile subscribers to communicate with the mobile radio network 510, each other, and users outside the subscribed network, both wireline and wireless. Theoretically, if the mobile unit is located exactly between the two transmitters 524a and 524b, the signal transmitted from each of the transmitters 524a and 524b would be received by the mobile unit 520 at exactly the same time—i.e., digital bits received by both transmitters 524a and 524b would line up exactly. As the mobile unit 520 moves towards the edge of the overlap zone 525, the mobile unit 520 captures the transmission from one of the transmitters, such as transmitter 524b. This "capture zone" can be defined as the area in which the carrier signal (signal strength) of the closer transmitter 524b exceeds the signal strength of the farther transmitter 524a by at least approximately 10 decibels (dB).

However, as the mobile unit 520 moves through the overlap zone 525 from one of the transmitters 524a towards the other of the transmitters 524b, the interference increases. This is due to the fact that a bit transmitted from the closer transmitter 524b would be received by the mobile unit 520 at an earlier time than the same bit would be received by the mobile unit 520 from the farther transmitter 524a. If this time difference (hereinafter referred to as the delay spread) becomes too large, the symbols begin to interfere with each other, and the mobile unit 520 may demodulate a symbol in error. The symbol errors caused by this self-imposed interference manifest themselves as problems such as limited access to the system, retransmissions of the signal, loss of audio and/or loss of data.

Some systems are tolerant of time delay. For example, in the Enhanced Digital Access Communication System (EDACS®) (M/A Com, Lowell Mass.), transmitter site overlap design parameters allow approximately 30-40 μsec of delay spread with capture ratio ranges of 8-12 dB. The system is theoretically designed so that the mobile unit 520 can receive the signal without significant error. In practice, however, most simulcast systems have some overlap regions in which the overlap design parameters are exceeded and the system coverage is severely degraded or unusable. Additionally, in some simulcast systems, more than two transmitters overlap, which can exacerbate this problem.

Furthermore, this overlap problem is more severe for higher data rates because the ratio of the size of the overlap zone to the capture zone increases. In other words, the probability that a delayed symbol will be demodulated causing a symbol error increases as the clock speed increases. For example, as the bit rate increases from 9.6 kb/s and to 16 kb/s, the theoretical time delay tolerance drops from 50 μsec to 30 μsec, respectively. Furthermore, in practice, the real time delay tolerance is likely to be lower for the reasons mentioned above. Thus, for digital radio transmissions such as control channel, digital voice, or data, a simulcast system almost always provides non-uniform coverage.

Therefore, some kind of equalization of the signals is required to compensate for this time delay. Equalization is a known concept in simulcast networks and involves adjusting the magnitude and phase of received signals using complex channel coefficients to make the signals from different sites essentially equal in magnitude and phase. This concept is considered in greater detail in *Equalization—Digital Communications* Digital Communications 4th edition 2001 Chapter 11 by John G. Proakis. One well-known approach for equalization is covered by GSM. In GSM, equalization is perforated at the receiver with the help of the training sequences transmitted as part of the midamble in every time slot. The type of equalizer used for GSM is not specified and is left up to the manufacturer as to the method of implementation. Although this standard relates to a high-speed communication system (270 kb/s), it is limited in the time delay for which it can compensate—about 15 μsec. Applicant has determined, however, that such a limitation renders this approach inadequate for typical simulcast networks in which time delays of up to 100 μsec can be expected.

Another possible equalization approach for managing long time delays in a high speed simulcast network involves determining the actual distance between the transmitting sites and using this information to calculate the expected time delay. To this end, the transmitting sites would be outfitted with global positioning devices to provide location information, which would be encoded in the transmitted signal. This approach, although viable, would add complexity and expense to the system.

Therefore, there is a need for equalizing signals in a high speed simulcast network to compensate for large time delay range, while avoiding complex and costly location-determining devices. The present invention fulfills this need among others.

SUMMARY OF INVENTION

The present invention facilitates signal equalization in a high-speed simulcast network having significant time delays while avoiding complicated GPS devices and high computational overhead. Specifically, the system of the present invention determines the time delay and complex channel coefficients for equalization using a pre-established set of time delay filters. The pre-established set of time delay filters is determined ahead of time based on presumed time delays and is stored in memory. The concept of calculating time delay filters ahead of time is based on the recognition that there are only a limited number of dominate sites in a simulcast system—usually two. Furthermore, the expected time delay of the sites which are likely to have potentially interfering signals is also limited—typically to about 100 μsec or so.

Using this set of time delay filters, predicted simulcast signals are generated which are then compared to the actual simulcast signal. The actual time delay data may be derived from the predicted simulcast signal which is closest to the actual simulcast signal. Thus, rather than determining time delay based on the received simulcast signal which is difficult and time consuming, the present invention approximates the time delay using a predetermined, stored set of time delay filters. This saves computation time and overhead.

Accordingly, one aspect of the present invention is a method for determining channel coefficients for a simulcast signal based on a predetermined set of time delay filters. In a preferred embodiment, the method comprises: (a) receiving a simulcast signal comprising known data simulcast from at least two different sites; (b) generating a number of simulated simulcast signals, each simulated simulcast signal being based on at least two sites transmitting the known data with a presumed time delay, each simulated simulcast signal having a different presumed time delay; (c) determining which of the simulated simulcast signals is an optimum simulated simulcast signal that correlates most closely to the received simulcast signal; and (d) providing time delay data of the optimum simulated simulcast signal for use in equalization of the simulcast signal.

Another aspect of the invention is a mobile unit suitable for use in a simulcast network which equalizes received simulcast signals using a predetermined time day function. In a preferred embodiment, the mobile unit comprises: (1) a receiver for receiving a simulcast signal; (2) a transmitter for transmitting a signal to a simulcast network; (3) a processor operatively connected to the receiver and the transmitter; and (4) memory operatively connector to the processor and being configured to instruct the process to perform the following steps: (a) receiving a simulcast signal comprising known data simulcast from at least two different sites; (b) generating a number of simulated simulcast signals, each simulated simulcast signal being based on at least two sites transmitting the known data with a presumed time delay, each simulated simulcast signal having a different presumed time delay; (c) determining which of the simulated simulcast signals is an optimum simulated simulcast signal that correlates most closely to the simulcast signal; and (d) providing time delay data of the optimum simulated simulcast signal for use in equalization of the simulcast signal.

Still another aspect of the invention is software for having a processor of the mobile unit described above perform the method described above. In a preferred embodiment, the software comprises a computer-readable medium, such as a disk, having instructions for having a mobile unit processor perform the following steps: (a) receiving a simulcast signal comprising known data simulcast from at least two different sites; (b) generating a number of simulated simulcast signals, each simulated simulcast signal being based on at least two sites transmitting the known data with a presumed time delay, each simulated simulcast signal having a different presumed time delay; (c) determining which of the simulated simulcast signals is an optimum simulated simulcast signal that correlates most closely to the simulcast signal; and (d) providing time delay data of the optimum simulated simulcast signal for use in equalization of the simulcast signal.

Yet another aspect of the invention is a simulcast network comprising a mobile unit which equalizes received simulcast signals by determining channel coefficients for the signal based on presumed time delays. In a preferred embodiment, the network comprises: (1) at least two sites for simulcasting a signal having known data; (2) a mobile unit positionable between the two sites such that a simulcast signal received from the two sites has a time delay, and comprising: (i) a receiver for receiving a simulcast signal; (ii) a transmitter for transmitting a signal to a simulcast network; (iii) a processor operatively connected to the receiver and the transmitter; and (iv) memory operatively connector to the processor and being configured to instruct the process to perform the following steps: (a) receiving a simulcast signal comprising known data simulcast from at least two different sites; (b) generating a number of simulated simulcast signals, each simulated simulcast signal being based on at least two sites transmitting the known data with a presumed time delay, each simulated simulcast signal having a different presumed time delay; (c) determining which of the simulated simulcast signals is an optimum simulated simulcast signal that correlates most closely to the simulcast signal; and (d) providing time delay data of the optimum simulated simulcast signal for use an equalization of the simulcast signal.

DETAILED DESCRIPTION OF PREFERRED EMBODIMENT

Figure 1:
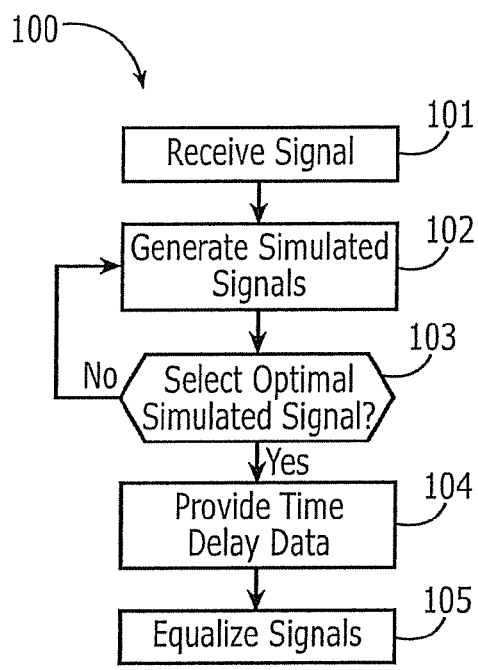
FIG. 1 shows a flow chart of a preferred embodiment of the method of the present invention.

Referring to FIG. 1, a flow chart 100 of a preferred embodiment of a method for equalizing signals in a simulcast network is shown. The process comprises a step 101 in which a simulcast signal is received comprising known data simulcast from at least two different sites. In step 102, simulated simulcast signals are generated, each simulated simulcast signal being based on at least two sites transmitting the known data with a presumed time delay, each simulated simulcast signal having a different presumed time delay. Step 103 involves determining which of the simulated simulcast signals is an optimum simulated simulcast signal that correlates most closely to the simulcast signal. And finally, in Step 104, the complex channel coefficients and/or time delay data of the optimum simulated simulcast signal is provided for use in equalization of the simulcast signal. Optionally, steps 102 and 103 may be reiterated to determine the optimum simulated simulcast signal as discussed below. Also optionally, the simulcast signal may be equalized in step 105 using the channel coefficients provided in step 104.

Each of these steps is considered below in greater detail. It should be understood, however, that that the method of the present invention is segregated into these steps for description purposes only, and it is well within the scope of the invention that two or more of these steps be combined into a common step or that a single step be subdivided into two or more discrete steps.

In step 101, a mobile unit receives a simulcast signal comprising known data simulcast from at least two different sites. The mobile unit may be any mobile unit used in a simulcast network, including, for example, a hand-held radio unit or car mounted mobile station.

The known data may be any data which is consistently transmitted from a transmission site to the mobile unit prior to the transmission of "payload" information which is not known. In a preferred embodiment, the known data is the data in the synchronization signal, which is transmitted as part of a known protocol to synchronize clock rates. More preferably, the known data is part of the pilot signal which is specified in the synchronization media access protocol.

The received signal, Sn, may be represented mathematically as the sum of n-independently faded sites as follows:

$$Sn(t)=c(1)*s(t+\tau(1))+c(2)*s(t+\tau(2))+ \ldots +c(n)*s(t+\tau(n)) \quad (1)$$

wherein:
t is time
is the signal transmitted from each site
$\tau$ is time delay
c is a channel coefficient The known pilot delay matrix, P, may be represented as a matrix composed of time shifted versions of the pilot signal as follows:

$$P(\tau)=[p(t+\tau(1))|p(t+\tau(2))| \ldots |p(t+\tau(n))] \quad (2)$$

wherein: p is the pilot signal transmitted from each site.

Therefore, by combining Equations (1) and (2), the received data, R(t), can be represented as follows:

$$R(t)=c(1)*p(t+\tau(1))+c(2)*p(t+\tau(2))+ \ldots +c(n)*p(t+\tau(n))+n(t)=c*P(\tau)+n(t) \quad (3).$$

Therefore, Equation (3) provides a mathematical representation of the received signal before the channel coefficients and time delay are determined. Although the channel coefficients are not known at this point, it is important that the form of the signal be defined so its variables can be modeled in a time delay function as described below.

In step 102, simulated simulcast signals are generated using a time delay function. More specifically, using a time delay function which is based on incremental time delays over an expected range for a predetermined number of transmitting sites, the mobile unit generates a series of simulated simulcast signals to approximate the actual received signal. An expected time delay range typically ranges from about 50 to 200 μsec. Although the presumed values can be modified to accommodate particular applications, it has been found that a delay range of about 100 μsec and two transmitting sites provides for suitable results.

With respect to the incremental time delays, in a preferred embodiment, step 102 is performed in a reiterative process—initially using coarse increments and then using finer increments as the range of the overall time delay is narrowed. To execute this iterative process, step 102 preferably comprises generating initially a coarse set of simulated simulcast signals using a time delay function comprising coarsely-incremented time delays. In step 103, a coarse optimum simulated simulcast signal is determined and the method returns to step 102. There, a fine set of simulated simulcast signals are generated within a relatively narrow time delay range which includes the time delay of the coarse optimum simulated simulcast signal. This fine set is generated using a time delay function comprising finely-incremented time delays which are shorter than those used initially. At this point the process returns to step 103 in which the optimum simulated simulcast signal is determined from the fine set of simulated signals.

It should be understood that the interplay between steps 102 and 103 is a reiterative process in the preferred embodiment and may be repeated as many times as needed to obtain the desired level of accuracy. That is, as more iterations between steps 102 and 103 are performed and the incremental presumed time delay becomes more narrow, the optimum simulated simulcast signal will become more precise, thereby resulting in more precise channel coefficients. Countering the benefits of additional iterations, however, is the increase in computational overhead such additional iterations require. Therefore, the decision of how many iterations to perform between steps 102 and 103 will be an optimization itself between computational resources and precision. It has been found that a system using existing EDACS hardware provides suitable results by performing one iteration—that is, steps 102 and 103 are performed twice.

A coarse increment of time delay is preferably about 5 to about 20 times a fine increment of time delay, and more preferably about 10 times a fine increment of time delay. For example, the coarse increment of time delay is preferably 10 μsec and a fine increment of time delay is 1 μsec. Thus, if the 10 increments of time delay are used in each filter bank (i.e., coarse and fine filter banks), then the coarse filter bank would cover an expected time delay range of 100 μsec and the fine filter bank would cover 10 μsec.

In a preferred embodiment, the time delay function is a set of filters and step 102 comprises first calculating a vector of channel coefficients as a product of the filters and the received simulcast signal, and then using the vector of channel coefficients to generate the simulated simulcast signals. The filters are calculated prior to receiving the simulcast signal and are stored in memory. Preferably, the filters are grouped in two or more sets, a coarse set having coarsely-incremented time delays, and at least one fine set having finely-incremented time delays as described above.

Although various techniques can be employed to determine the time delay functions or filters, preferably a least squares approach is used. Specifically, in the least squares approach, the estimate for the received signal, R_est, can be written as follows:

$$R\_est(t)=c\_est(1)*p(t+\tau(1))+c\_est(2)*p(t+\tau(2))+ \ldots +c\_est(n)*p(t+\tau(n))=c\_est*P(\tau) \quad (4)$$

wherein: c-est(1 . . . n) is a vector of complex channel coefficients.

The estimate that is used for the channel coefficients, c_est (i), can be found by minimizing the least square error of $E^2$ (dropping the time subscripts for easy reading) as follows:

$$E^2 = |R(t) - R\_est(t)|^2 = |R(t) - c\_est * P(\tau)|^2 = R^H * R - 2 * c\_est * R * P^H + c\_est^H * P^H * P * c\_est \quad (5)$$

wherein: H is Hermittian transpose.

Minimizing the mean square error with respect to c_est requires first taking its derivative and setting it equal to zero as follows:

$$dE^2/dc\_est = -2 * R * P^H + 2 * c\_est * P^H * P = 0 \quad (6)$$

Solving for c_est gives the well known least-squares estimate for the vector of channel coefficient estimates for the assumed delay vector $\tau = [\tau(1) \, \tau(2) \ldots \tau(n)]$ as follows:

$$C\_est = R(t) * P(\tau)^H (P(\tau) P(\tau)^H)^{-1} = R(t) * W_{LS}(\tau) \quad (7)$$

wherein: $W_{LS}(\tau)$ is a least square filter.

Therefore the channel coefficient estimate for the assumed delay vector, $\tau$, is calculated from the received data vector R(t) and the least square filters, $W_{LS}(\tau)$, which are calculated apriori and stored in memory.

Once simulated simulcast signals are generated, the optimum simulated simulcast signal is determined in step 103 as mentioned above. Also as mentioned above, this step is performed preferably as iteration with step 102. Although different approaches may be used for determining the optimum simulated simulcast signal, preferably, this step comprises calculating least square error between each simulated simulcast signal and the received simulcast signal.

More specifically, the error, E, for the specified delay vector, t, is calculated from the estimated channel vector c_est= [c_est (1) c_est (2) . . . c_est (n)] as follows:

$$E^2(t,\tau) = |R(t) - c\_est * P(\tau)|^2 \quad (8)$$

Figure 2:
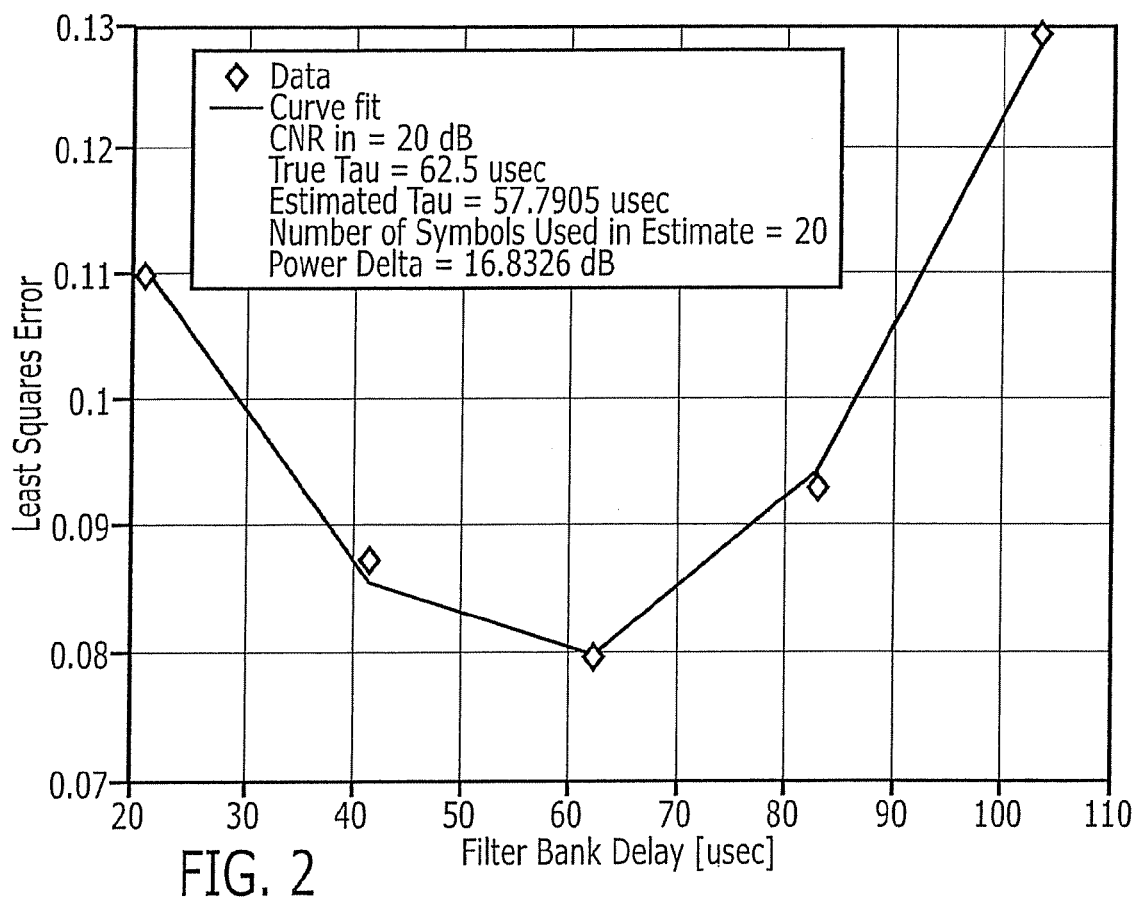
FIG. 2 shows an error surface created using coarsely-incremented filters.
Figure 3:
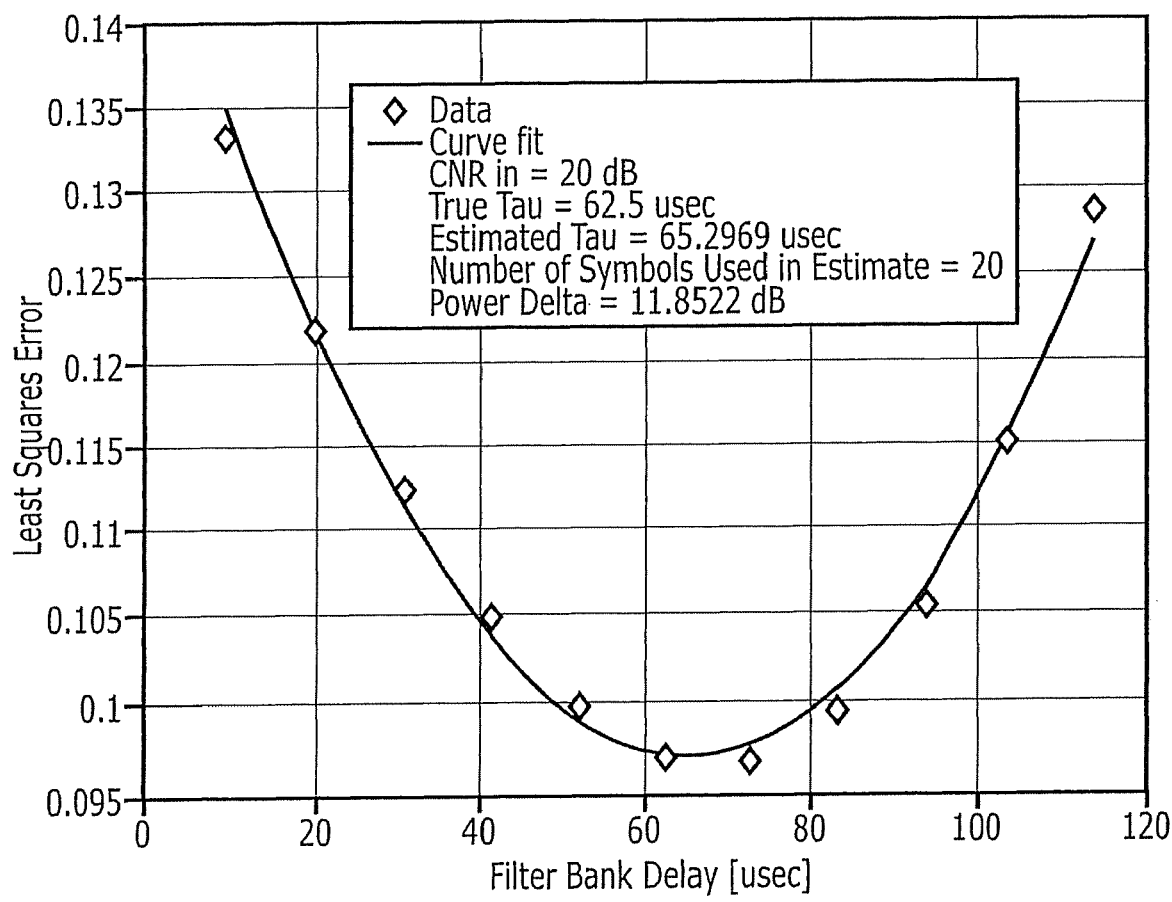
FIG. 3 shows an error surface created using finely-incremented filters.

The error surface is created using the different LS filters $W_{LS}(\tau)$ over the range of unknown delays as shown in FIG. 2. The region around the minimum value of the error surface is then used to interpolate to find the value of $\tau$ that minimizes the error surface for a single delay value being estimated. To refine the estimate, the process is reiterated using delay vectors over a finer grid and re-interpolating until the desired accuracy is obtained. FIG. 3 shows an error surface created using finer LS filters $W_{LS}$.

In step 104, the channel coefficients and/or time delays are provided for use in equalizing the simulcast signal as mentioned above. Such equalization techniques and approaches are well known in the field and are discussed for example in *Equalization—Digital Communications* by John G. Proakis, mentioned above.

In a preferred embodiment, the present invention also comprises step 105, equalizing the received signals using the channel coefficients and/or time delay provided in step 104 using one or more known equalization techniques described in Proakis. The estimated time delays can also be used as part of a geo-location system since the vector of time delays that are estimated uniquely correspond to a spatial location.

Figure 4:
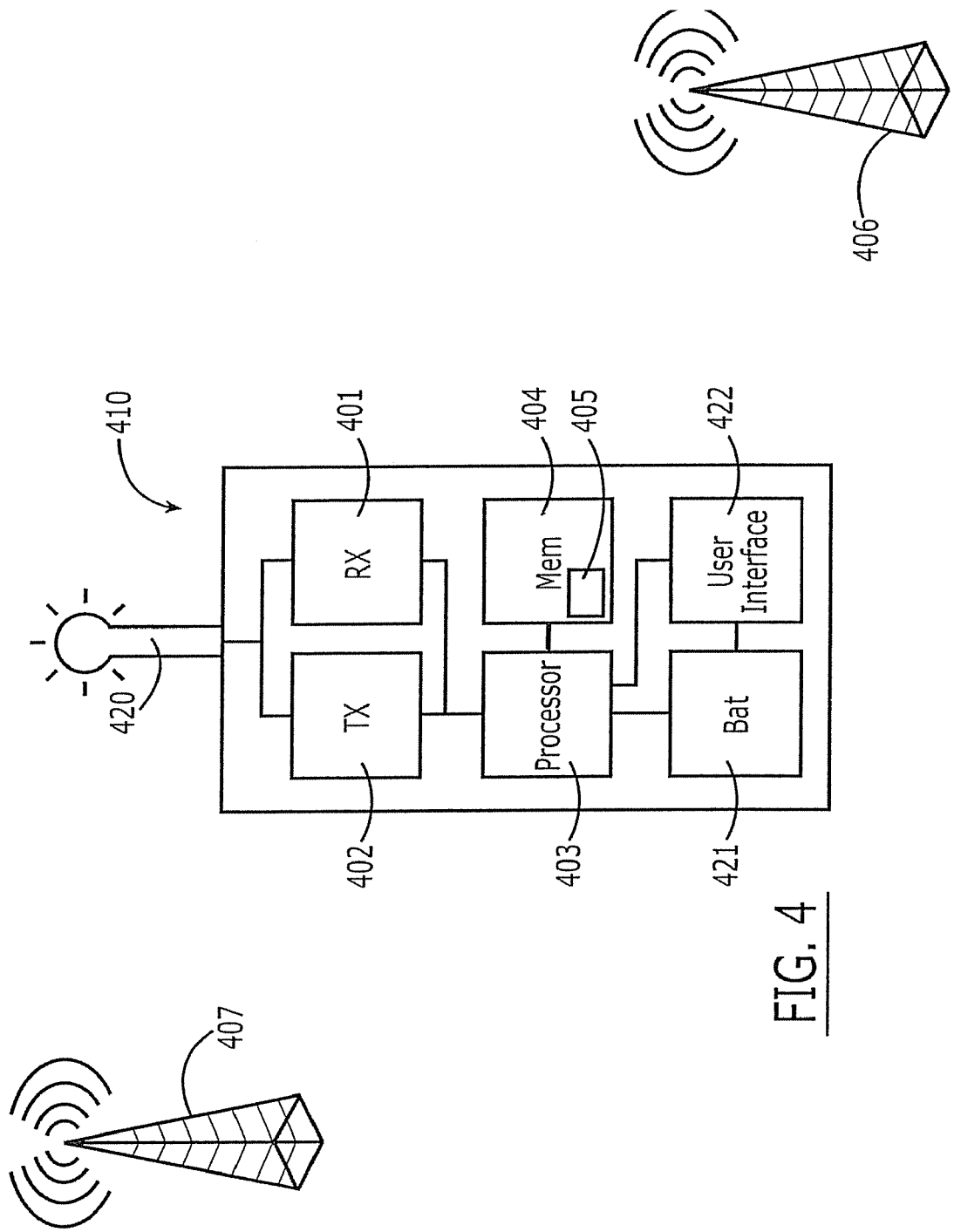
FIG. 4 shows a preferred embodiment of a mobile unit of the present invention in a simulcast network.
Figure 5:
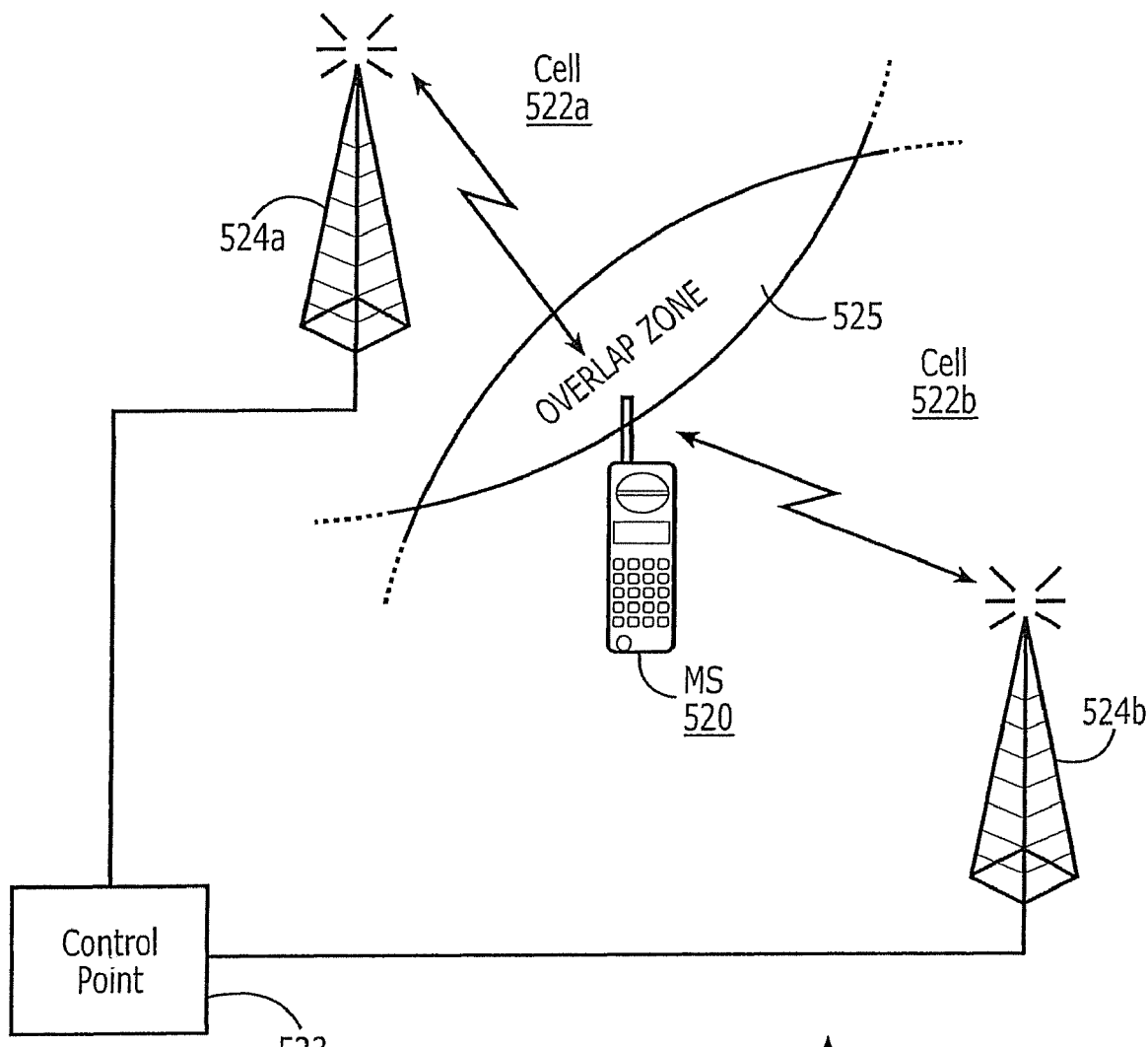
FIG. 5 shows a prior art simulcast network.

In addition to providing a method for facilitating the equalization described above, the present invention also provides a mobile unit 520 as depicted in FIG. 5, but configured in accordance with the method of the present invention described above. That is, referring to FIG. 4, the mobile unit 410 comprises: an antenna 420, a receiver 401 connected to the antenna 420 for receiving a simulcast signal; a transmitter 402 connected to the antenna 420 for transmitting a signal to a simulcast network; a processor 403 operatively connected to the receiver 401 and the transmitter 402; memory 404 operatively connector to the processor 403, a user interface 422 such a speaker, screen or keyboard connected to the processor 403 (perhaps via driver circuitry), and a battery 421 connected to the user interface 422, processor 402 and any other component/circuitry requiring power.

The memory is configured to instruct the processor to perform the following steps: (a) step 101, receiving a simulcast signal comprising known data simulcast from at least two different sites; (b) step 102, generating a number of simulated simulcast signals, each simulated simulcast signal being based on at least two sites transmitting the known data with a presumed time delay, each simulated simulcast signal having a different presumed time delay; (c) step 103, determining which of the simulated simulcast signals is an optimum simulated simulcast signal that correlates most closely to the simulcast signal; and (d) step 104, providing time delay data of the optimum simulated simulcast signal for use in equalization of the simulcast signal.

Preferably, the mobile unit 410 of the present invention comprises a processor and memory similar or the same as those contained in a conventional EDACS mobile unit, except that the memory is configured with one or more sets of filters (e.g., coarse, fine) for generating simulated simulcast signals and instructions for having the processor perform the functions described above in steps 101-104. Configuring a conventional memory to have the processor perform these functions is well known in the art in light of this disclosure and may be performed using existing EDACS® hardware.

Preferably, step 102, generating a number of simulated simulcast signals, comprises: (i) calculating a vector of channel coefficients as a product of filters and the received simulcast signal; and (ii) using the vector of channel coefficients to generate the simulated simulcast signals, wherein the filters 405 are stored in the memory prior to receiving the signal.

Another aspect of the invention comprises software containing instructions for having a processor of a mobile unit perform the steps 101-104 as described above. The software may be contained on any computer readable medium such as a disk (e.g., CD, DVD, floppy, micro disk, hard drive), tape, or memory (e.g., memory stick, RAM, DRAM, ROM).

Yet another aspect of the invention is a simulcast network 400 comprising a mobile unit 410 described above. Referring to back to FIG. 4, the network 400 comprises: at least two sites 406, 407 for simulcasting a signal having known data, and the mobile unit 410 positionable between the two sites such that a simulcast signal received from the two sites has a time delay between the signals transmitted from different sites. It is worthwhile to mention that since the present invention allows for greater time delay between transmission sites, the sites can be spaced further apart. For example, it has been found that the method of the present invention allows the site density to be reduced by about 30 to about 50% while maintaining an acceptable bit error rate. This is important as it reduces site density which reduces infrastructure costs.

What is claimed is:

1. A method for equalizing a simulcast pilot signal at a mobile wireless communications device comprising:

receiving, at the mobile wireless communications device, the simulcast pilot signal from a plurality of wireless base stations at different locations;

generating, at the mobile wireless communications device, a plurality of simulated pilot signals from a matrix comprising a plurality of time delayed versions of the simulcast pilot signal based upon a plurality of filters, each simulated pilot signal being based on a corresponding time delay;

determining, at the mobile wireless communications device, a closest match simulated pilot signal from the plurality of simulated pilot signals for the simulcast pilot signal; and equalizing, at the mobile wireless communications device, the received simulcast pilot signal using a respective time delay of the closest match simulated pilot signal;

wherein the plurality of filters comprises a set of first filters, each successive first filter having a corresponding time delay incremented a first value, and a set of second filters, each successive second filter having a corresponding time delay incremented a second value, the second value being smaller than the first value.

2. The method of claim 1 wherein the received simulcast pilot signal includes synchronization data.

3. The method of claim 1 wherein the generating of the plurality of simulated pilot signals comprises:

calculating a vector of channel coefficients using the plurality of filters and the received simulcast pilot signal; and using the vector of channel coefficients to generate the plurality of simulated pilot signals.

4. The method of claim 3 wherein the plurality of filters are calculated prior to receipt of the received simulcast pilot signal and are stored in a memory of the mobile wireless communications device.

5. The method of claim 3 wherein the plurality of filters comprises a plurality of least square filters.

6. The method of claim 1 wherein the plurality of simulated pilot signals comprises two simulated pilot signals.

7. The method of claim 1 wherein the received simulcast pilot signal has a range of potential time delays; and wherein the corresponding time delay for each of the plurality of simulated pilot signals are in the range of potential time delays.

8. The method of claim 7 wherein the range of potential time delays comprises 50 to 200 microseconds.

9. The method of claim 1 wherein the corresponding time delay for each of the plurality of simulated pilot signals is incremented.

10. The method of claim 1 wherein determining the closest match simulated pilot signal comprises calculating a least square error between each simulated pilot signal and the received simulcast pilot signal.

11. The method of claim 1 further comprising equalizing the received simulcast pilot signal from different sites.

12. A method for equalizing a simulcast pilot signal at a mobile wireless communications device comprising:

receiving, at the mobile wireless communications device, the simulcast pilot signal from a plurality of wireless base stations at different locations;

generating, at the mobile wireless communications device, a plurality of simulated pilot signals from a matrix comprising a plurality of time delayed versions of the simulcast pilot signal, each simulated pilot signal being based on a corresponding time delay;

generating a coarse set of simulated pilot signals using coarsely-incremented time delays, each successive coarse simulated pilot signal having a corresponding time delay incremented a first value;

determining initially a coarse closest match simulated pilot signal from the coarse set of simulated pilot signals;

generating a fine set of simulated pilot signals using finely-incremented time delays and based upon the coarse closest match simulated pilot signal, each successive fine simulated pilot signal having a corresponding time delay incremented a second value;

determining, at the mobile wireless communications device, a closest match simulated pilot signal from the fine set of simulated pilot signals, the second value being smaller than the first value; and equalizing, at the mobile wireless communications device, the received simulcast pilot signal using a respective time delay of the closest match simulated pilot signal.

13. The method of claim 12 wherein the first value is 5 to 20 times the second value.

14. A mobile wireless communications device comprising:
a wireless transceiver; and
a processor cooperating with said wireless transceiver and configured to receive a simulcast pilot signal from a plurality of wireless base stations at different locations, generate a plurality of simulated pilot signals from a matrix comprising a plurality of time delayed versions of the simulcast pilot signal based upon a plurality of filters, each simulated pilot signal being based on a corresponding time delay, determine a closest match simulated pilot signal from the plurality of simulated pilot signals for the received simulcast pilot signal, and equalize the received simulcast pilot signal using a respective time delay of the closest match simulated pilot signal;

wherein the plurality of filters comprises a set of first filters, each successive first filter having a corresponding time delay incremented a first value, and a set of second filters, each successive second filter having a corresponding time delay incremented a second value, the second value being smaller than the first value.

15. The mobile wireless communications device of claim 14 wherein the received simulcast pilot signal includes synchronization data.

16. The mobile wireless communications device of claim 14 wherein said processor is configured to generate the plurality of simulated pilot signals by at least:

calculating a vector of channel coefficients using the plurality of filters and the received simulcast pilot signal; and using the vector of channel coefficients to generate the plurality of simulated pilot signals.

17. The mobile wireless communications device of claim 16 further comprising a memory; and wherein said processor is configured to:

calculate the plurality of filters prior to receipt of the received simulcast pilot signal; and store the plurality of filters in said memory.

18. The mobile wireless communications device of claim 16 wherein the plurality of filters comprises a plurality of least square filters.

19. The mobile wireless communications device of claim 14 wherein the received simulcast pilot signal has a range of potential time delays;

and wherein the corresponding time delay for each of the plurality of simulated pilot signals are in the range of potential time delays.

20. The mobile wireless communications device of claim 14 wherein said processor is configured to determine the closest match simulated pilot signal by at least calculating a least square error between each simulated pilot signal and the received simulcast pilot signal.

21. A mobile wireless communications device comprising:
a wireless transceiver; and
a processor cooperating with said wireless transceiver and configured to receive a simulcast pilot signal from a plurality of wireless base stations at different locations, generate a plurality of simulated pilot signals from a matrix comprising a plurality of time delayed versions of the simulcast pilot signal, each simulated pilot signal being based on a corresponding time delay, generate a coarse set of simulated pilot signals using coarsely-incremented time delays, each successive coarse simulated pilot signal having a corresponding time delay incremented a first value, determine initially a coarse closest match simulated pilot signal from the coarse set of simulated pilot signals, generate a fine set of simulated pilot signals using finely-incremented time delays and based upon the coarse closest match simulated pilot signal, each successive fine simulated pilot signal having a corresponding time delay incremented a second value, determine a closest match simulated pilot signal from the fine set of simulated pilot signals, the second value being smaller than the first value, and equalize the received simulcast pilot signal using a respective time delay of the closest match simulated pilot signal.

22. A wireless communication system comprising:

a plurality of wireless base stations simulcasting a pilot signal from different locations; and a mobile wireless communications device comprising a wireless transceiver, and a processor cooperating with said wireless transceiver and configured to receive the simulcast pilot signal, generate a plurality of simulated pilot signals from a matrix comprising a plurality of time delayed versions of the simulcast pilot signal based upon a plurality of filters, each simulated pilot signal being based on a corresponding time delay, determine a closest match simulated pilot signal from the plurality of simulated pilot signals for the received simulcast pilot signal, and equalize the received simulcast pilot signal using a respective time delay of the closest match simulated pilot signal;

wherein the plurality of filters comprises a set of first filters, each successive first filter having a corresponding time delay incremented a first value, and a set of second filters, each successive second filter having a corresponding time delay incremented a second value, the second value being smaller than the first value.

23. The wireless communication system of claim 22 wherein the received simulcast pilot signal includes synchronization data.

24. The wireless communication system of claim 22 wherein said processor is configured to generate the plurality of simulated pilot signals by at least:

calculating a vector of channel coefficients using the plurality of filters and the received simulcast pilot signal; and using the vector of channel coefficients to generate the plurality of simulated pilot signals.

25. The wireless communication system of claim 24 wherein said mobile wireless communications device further comprises a memory; and wherein said processor is configured to:

calculate the plurality of filters prior to receipt of the received simulcast pilot signal; and store the plurality of filters in said memory.

26. The wireless communication system of claim 24 wherein the plurality of filters comprises a plurality of least square filters.

27. The wireless communication system of claim 22 wherein the received simulcast pilot signal has a range of potential time delays;

and wherein the corresponding time delay for each of the plurality of simulated pilot signals are in the range of potential time delays.

28. The wireless communication system of claim 22 wherein said processor is configured to determine the closest match simulated pilot signal by at least calculating a least square error between each simulated pilot signal and the received simulcast pilot signal.

29. A wireless communication system comprising:

a plurality of wireless base stations simulcasting a pilot signal from different locations; and a mobile wireless communications device comprising a wireless transceiver, and a processor cooperating with said wireless transceiver and configured to receive the simulcast pilot signal, generate a plurality of simulated pilot signals from a matrix comprising a plurality of time delayed versions of the simulcast pilot signal, each simulated pilot signal being based on a corresponding time delay, generate a coarse set of simulated pilot signals using coarsely-incremented time delays, each successive coarse simulated pilot signal having a corresponding time delay incremented a first value, determine initially a coarse closest match simulated pilot signal from the coarse set of simulated pilot signals, generate a fine set of simulated pilot signals using finely-incremented time delays and based upon the coarse closest match simulated pilot signal, each successive fine simulated pilot signal having a corresponding time delay incremented a second value, determine a closest match simulated pilot signal from the fine set of simulated pilot signals, the second value being smaller than the first value, and equalize the received simulcast pilot signal using a respective time delay of the closest match simulated pilot signal.

* * * * *